United States Patent [19]
Stringer

[11] 3,973,620
[45] Aug. 10, 1976

[54] AIR CONDITIONING SYSTEMS FOR MOTOR VEHICLES

[75] Inventor: Roy Ernest Stringer, Birmingham, England

[73] Assignee: Chrysler United Kingdom Limited, London, England

[22] Filed: Aug. 19, 1974

[21] Appl. No.: 498,564

[30] Foreign Application Priority Data
Aug. 24, 1974 United Kingdom............... 40321/74

[52] U.S. Cl.................................... 165/42; 62/244
[51] Int. Cl.²........................................ B60H 3/04
[58] Field of Search .................. 165/42, 43; 62/244

[56] References Cited
UNITED STATES PATENTS

| | | | |
|---|---|---|---|
| 2,082,230 | 6/1937 | Stout et al. ............................ | 165/43 |
| 2,193,835 | 3/1940 | Murphy et al. ................... | 165/42 X |
| 2,789,794 | 4/1957 | Moore et al. ......................... | 165/43 |
| 2,796,820 | 6/1957 | Moore et al. ...................... | 165/43 X |
| 3,170,509 | 2/1965 | Rees et al. ............................. | 165/42 |
| 3,219,103 | 11/1965 | Berry et al. ............................ | 165/42 |
| 3,289,564 | 12/1966 | Coye De Castelet ............. | 62/244 X |
| 3,834,451 | 9/1974 | Kozinski ............................ | 165/43 X |
| 3,854,525 | 12/1974 | Illg ....................................... | 165/42 |

*Primary Examiner*—Albert W. Davis, Jr.
*Attorney, Agent, or Firm*—Edward F. Connors

[57] ABSTRACT

The disclosure relates to a motor vehicle body having a passenger compartment with an air conditioning installation comprising a plenum chamber located externally of the compartment and having an inlet for fresh air and an outlet leading into an air heater in the passenger compartment. Air is delivered through the outlet plenum of the chamber by an air blower which is supplied by a separate duct in the plenum chamber containing an air cooler. The duct has valve controlled openings into the plenum chamber to receive fresh air and into the passenger compartment for recirculation of air from the compartment.

4 Claims, 2 Drawing Figures

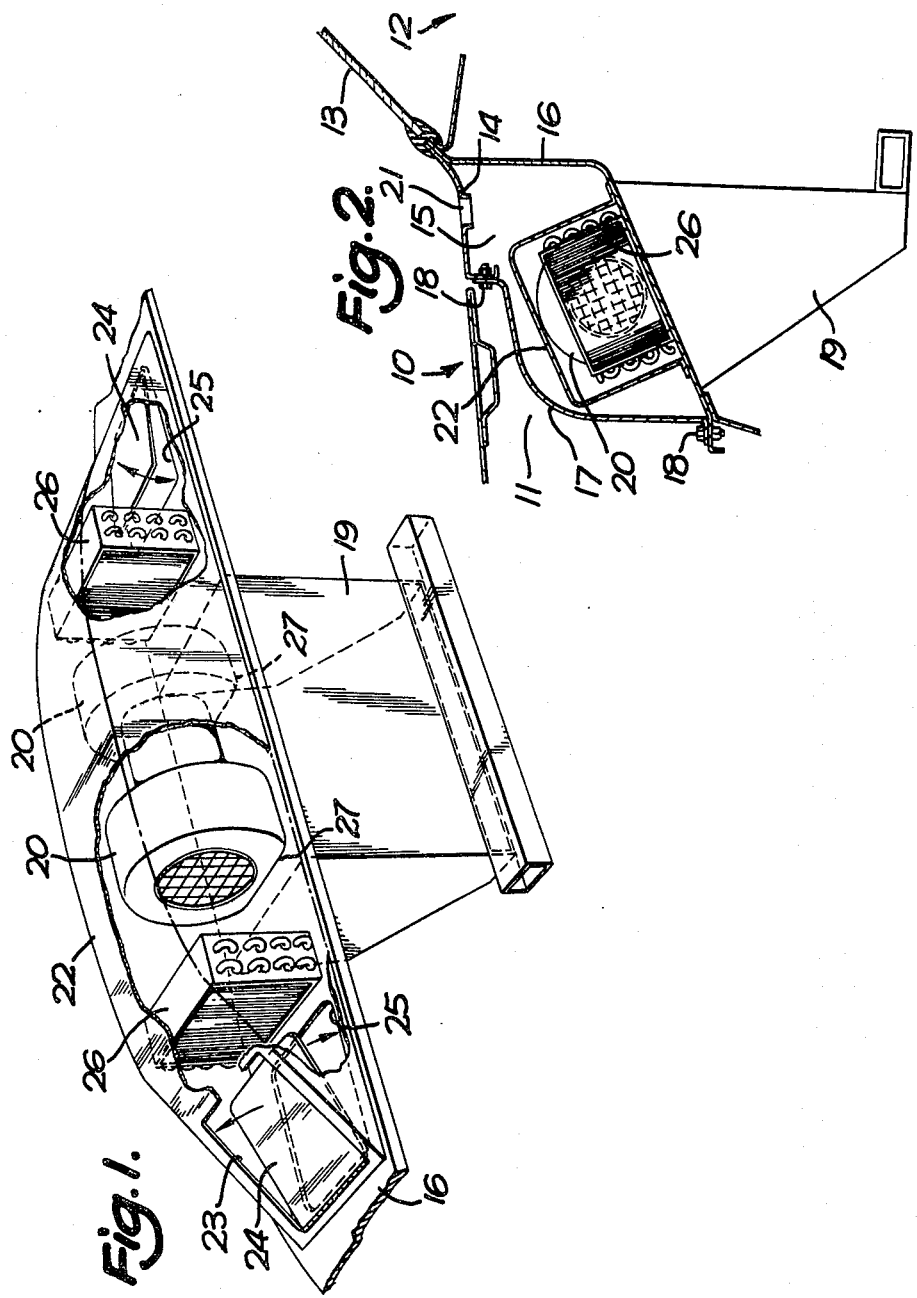

AIR CONDITIONING SYSTEMS FOR MOTOR VEHICLES

BACKGROUND OF THE INVENTION

1. Field of the Invention

The invention relates to air conditioning installations in motor vehicle bodies.

2. Description of the Prior Art

Motor vehicles are normally provided with an air heater installation for providing fresh heated air or heating recirculated air for the passenger compartment of the vehicle. Currently, it is becoming an increasing practice to provide, as an optional extra, an air conditioning installation capable of supplying both cooled and heated air. Usually this involves providing a completely separate system from a conventional air heater system as shown for example in U.S. Patent Specification No. 3,289,564.

The object of the present invention is to provide an installation which can readily be adapted from an air heater installation only to an air conditioning installation for both heating and cooling air.

Summary of the Invention

The invention provides a motor vehicle body having a passenger compartment and an air conditioning installation for the compartment comprising an elongate plenum chamber extending along an outerside of a front wall of the compartment, an air inlet into the chamber, an air outlet from the chamber into the compartment, an air heater in the compartment connected to said outlet to receive air from the outlet, at least one air blower in said chamber to deliver air from the chamber into the outlet, a duct mounted in the chamber to deliver air in the blower, the duct having at least one aperture to receive air from the chamber and an air cooler mounted in the duct between said aperture and the fan to cool the air, if required, which is delivered to the fan and thence to the passenger compartment.

BRIEF DESCRIPTION OF THE DRAWINGS

FIG. 1 is a diagrammatic perspective view of part of an air conditioning system of a motor vehicle body; and FIG. 2 is a cross-sectional view through the system shown in FIG. 1.

DESCRIPTION OF THE PREFERRED EMBODIMENT

The drawings show part of a motor vehicle body indicated generally at 10 comprising an engine compartment 11, a passenger compartment 12, a front windscreen 13 and a scuttle 14.

A closed plenum chamber 15 extends across the vehicle body in front of the passenger compartment 12. The chamber 15 is bounded at its upper end by the scuttle 14, along its rearward and lower side by the front wall 16 of the passenger compartment and along its forward side by a removable cover 17 secured to the scuttle 14 and wall 16 by bolts 18. A heater unit 19 is mounted within the passenger compartment 12 on the underside of the front wall 16 and is in communication through an aperture or apertures (not shown) with the plenum chamber 15. Two motor driven centrifugal blowers 20 are mounted side by side in the plenum chamber 15 on the wall 16 to deliver air from the chamber through the heater unit 19 into the passenger compartment. The plenum chamber 15 has an air intake 21 formed in the scuttle 14. The above components form an air conditioning system for the passenger compartment of the vehicle where heated air and air at ambient temperature are required.

In the case where it is also desired to cool the air supply to the passenger compartment an inverted channel-section duct 22 is mounted in the chamber 15 on the bottom wall 16 thereof, the duct extending along the chamber to either side of the fans 20. Each end of the duct tapers in cross-section and the bottom wall of the duct adjacent each end thereof is formed with an inlet aperture 23 controlled by a flap valve 24 integral with the duct. Opposite the aperture 23, the wall 16 of the passenger compartment is formed with a similar inlet aperture 25 arranged so that in one position of the flap valve 24 the aperture 25 is closed and the aperture 23 is opened whereas in the other position of the flap valve the aperture 25 is opened and the aperture 23 is closed. The flap valves 24 at the two ends of the duct are connected by a common control mechanism to operate in unison. Thus by appropriate operation of the flap valve 24, air can be drawn into the duct by the fans either from the chamber 15 which receives air through the air intake 21 or from the passenger compartment itself through aperture 25.

Evaporator cores 26 are mounted within the duct 22 between the end thereof and the fan 20 to cool the air delivered through the heater unit to the passenger compartment if required. The evaporator cores are connected in a refrigerator system including a condenser mounted near the vehicle radiator, valve units and a circulating compressor driven by the engine.

Thus a supply of fresh air can be delivered to the passenger compartment at ambient temperature; the air can be heated using the heater unit; the air can be cooled using the evaporator cores; air can be recirculated from the passenger compartment and either heated or cooled or can be dehumidified using the cooler to cause condensation of moisture from the air on the cooling surfaces and then re-heated using the heater unit.

It will be appreciated that the above arrangement permits a vehicle equipped with the heater unit described to be readily provided with an air cooling system. It will be appreciated that the motor driven fans 20 may be mounted so that they are readily detachable from the chamber to permit substitution of motor driven fans of greater capacity if necessary without disturbing the remainder of the heater system.

It will also be appreciated that the outlines of the inlet apertures 25 may be formed by partially shearing through the panel 16 at the appropriate locations when manufacturing the panel so that the metal within the outlines can readily be removed when it is desired to form the inlet apertures.

I claim:

1. For use with a motor vehicle body having a passenger compartment provided with a vertically extending front fire wall, an air-conditioning installation for the passenger compartment comprising an elongate plenum chamber extending along the outside of a part of the front fire wall of the compartment, an air inlet into the chamber, a main air outlet from the chamber in said part of the front wall, air-heater means in the passenger compartment in communication with the air outlet from the plenum chamber, subsidiary air apertures in said part of the front wall disposed in line with and on either side of the main outlet, a duct extending along said part of the front wall and open to the main outlet and subsidiary apertures, air inlets in the duct located adjacent said subsidiary apertures for introducing fresh air into the duct, air-cooler means in the duct, said air cooler means comprising air-coolers located adjacent the ends of the duct, air-blower means in the duct to draw air from the duct and discharge the air through the main outlet, and the valve means for opening and closing the subsidiary apertures and the air inlets in the duct to selectively provide a flow of fresh air through the duct into the passenger compartment and recirculation of air from the passenger compartment through the duct and back to the passenger compartment.

2. The invention of claim 1 wherein the two air inlets in the duct are disposed opposite the two subsidiary apertures in said front wall of the passenger compartment respectively and flap valves are provided for each air inlet and its associated subsidiary aperture to open and close the inlets or apertures as required.

3. The invention of claim 1 wherein the duct comprises a channel section member extending along the front wall of the passenger compartment.

4. The invention of claim 1 wherein the blower means comprise two fans spaced apart along the duct at the center thereof for drawing air from the duct on either side of the center and discharging the air through the main air outlet and the air-cooler means comprise air-coolers located respectively between the fans and the ends of the duct.

* * * * *